United States Patent [19]
Barnscheidt et al.

[11] Patent Number: 4,721,562
[45] Date of Patent: Jan. 26, 1988

[54] AERATING APPARATUS

[75] Inventors: Wolfgang Barnscheidt, Dormagen-Straberg; Horst von Borries, Krefeld; Robert Rautenbach, Aachen; August Schiffermüller, Erkrath; Hubert Zimmermann, Aachen, all of Fed. Rep. of Germany; Jean-Pierre Lamort, Vitry-le-Francois, France

[73] Assignees: Feldmuële Aktiengesellschaft, Duesseldorf, Fed. Rep. of Germany; E. et. M. Lamort S.A., Vitry-le-Francois, France

[21] Appl. No.: 805,471

[22] PCT Filed: Mar. 30, 1985

[86] PCT No.: PCT/EP85/00138
§ 371 Date: Nov. 20, 1985
§ 102(e) Date: Nov. 20, 1985

[87] PCT Pub. No.: WO85/04432
PCT Pub. Date: Oct. 10, 1985

[30] Foreign Application Priority Data

Apr. 3, 1984 [DE] Fed. Rep. of Germany ....... 3412431
May 17, 1984 [DE] Fed. Rep. of Germany ....... 3418328
Feb. 13, 1985 [DE] Fed. Rep. of Germany ....... 3504780

[51] Int. Cl.⁴ .......................... B03D 1/24; B01D 47/02
[52] U.S. Cl. .............................. 209/170; 261/DIG. 75; 261/76; 210/221.2
[58] Field of Search ....................... 209/168, 169, 170; 261/36 R, 76, DIG. 75; 210/221.2; 137/888, 889, 896

[56] References Cited

U.S. PATENT DOCUMENTS

| | | | |
|---|---|---|---|
| 1,562,126 | 11/1925 | Saives | 261/76 X |
| 1,810,131 | 6/1931 | Daily | 261/76 |
| 1,839,952 | 1/1932 | Daily | 261/76 |
| 2,695,710 | 11/1954 | Gibbs | 209/168 X |
| 3,397,871 | 8/1968 | Hasselberg | 261/DIG. 75 |
| 3,735,778 | 5/1973 | Garnier | 137/896 |
| 3,774,846 | 11/1973 | Schurig et al. | 261/DIG. 75 |
| 3,936,382 | 2/1976 | White | 261/76 X |
| 4,331,534 | 5/1982 | Barnscheidt | 209/170 |
| 4,347,128 | 8/1982 | Barnscheidt | 209/170 |
| 4,483,805 | 11/1984 | Glindsjö | 137/889 X |

FOREIGN PATENT DOCUMENTS

| | | | |
|---|---|---|---|
| 3245847 | 11/1984 | Fed. Rep. of Germany | 209/170 |
| 1057632 | 10/1953 | France | 261/76 |
| 1493946 | 7/1967 | France | 261/DIG. 75 |

*Primary Examiner*—S. Leon Bashore
*Assistant Examiner*—Thomas M. Lithgow
*Attorney, Agent, or Firm*—Felfe & Lynch

[57] ABSTRACT

The aeration of dispersions, especially the aeration of fiber suspensions in a flotation apparatus 1, is performed with a ring injector 2 to which air is delivered through air feed ducts 11 in the mixing section 4. The annular gap forming in the ring injector 2 is thus aerated inside and out. The center core 7, which tapers in the direction of the greatest free cross section Q4 of the ring injector 2, is provided with a fin 56 which prevents the rotation of the dispersion.

19 Claims, 9 Drawing Figures

AERATING APPARATUS

The invention relates to an apparatus for aerating dispersions, especially a flotation apparatus for the deinking of fiber suspensions, which consists essentially of a flotation cell with at least one ring injector associated with the latter, the ring injector containing a feed section, a mixing section and a discharge section through which there extends a center core forming an annular gap with the individual sections.

Apparatus for the aeration of dispersions have long been state of the art. They are used especially as flotation apparatus for the beneficiation of ores and coal, but they also serve for the aeration of water and waste water for the purpose of separating the foreign substances therein contained. A special field is the recycling of paper waste, or more precisely fiber suspensions made from paper waste, in which the coloring substances, i.e., the printing ink, becomes attached to air bubbles and is removed with the latter as froth. Since coal flotation and ore flotation operate analogously, the invention will be dealt with hereinbelow in conjunction with a flotation apparatus for the deinking of fiber suspensions, but it is not restricted thereto.

Flotation apparatus for deinking fiber suspensions are disclosed in German Federal Pat. Nos. 28 36 496 and 29 14 392, so that there is no need to explain them to any great extent. The fiber suspension in these apparatus is injected by a kind of venturi nozzle directly into the flotation apparatus, and air is entrained and distributed in the nozzle as the suspension passes through the nozzle. They operate, therefore, on the water jet pump principle, resulting in a fine distribution of air bubbles over the entire cross section of the flotation apparatus. It is a disadvantage of this process, however, that the nozzles can have only relatively small cross section in order to permit good aeration of the entire stream of fiber passing through them. This necessitates in turn the use of a plurality of nozzles, which, from the viewpoint of maintenance and of the manufacture of the nozzles as well as their installation in the flotation cell, is not desirable.

German Federal Pat. No. 30 15 788, therefore, already discloses the proposal of replacing a plurality of round nozzles by a flat nozzle with a certain ratio of cross section to circumference. This proposal, however, especially in the case of small flotation cells, results in a strong rotation in the flotation cell, so that the centrifugal forces cause the air to collect in the center of the cell, unable to fully develop its cleansing action.

On the other hand, in this design, due to its geometrical length and the pressure prevailing in the nozzle, the nozzles have a considerable weight, so that they could not easily be installed in pipelines. Thus, the problem of replacing a plurality of small, round injectors with a large injector was not solved.

The present invention, therefore, is addressed to the problem of creating an injector which can handle large flows of liquid, which will, in spite of its size, assure a perfect aeration of the liquid stream, and in which the liquid stream issues with such a velocity that, even when this stream is directed into round flotation cells, no great rotatory movement will develop which might cause a separation of the dispersion or suspension from the air it contains.

This problem is solved by an apparatus for aerating dispersions, especially by a flotation apparatus for deinking fiber suspensions, which consists essentially of a flotation cell having associated with it a ring injector which contains a feed section, a mixing section and a discharge section through which there extends a center core forming an annular gap, this apparatus being characterized by the combination of the following features:

The center core is mounted in the feeding section by means of at least one supporting arm, and forms with the outlet of the feeding section an annular gap with the cross section $Q_1$. The center core is offset in the area of the mixing section in the form of a step. The mixing section is expanded in relation to the outlet of the feed section in the form of a step and forms with the offset center core the cross section $Q_2$. Air feed lines extend into the stages of the mixing section and of the center core. The cross section $Q_3$ at the outlet of the mixing section is greater than the cross section $Q_2$ at the beginning of the mixing section. The cross section $Q_4$ at the outlet of the discharge section is greater than the cross section $Q_3$ at the end of the mixing section.

By the use of a ring injector it is possible to feed to a flotation cell any desired amounts of fiber suspensions. Situating the center core of the ring injector in its feed section provides such that, when the narrowest cross section based on the tapering in the feed section is reached, a quieting of the flow of the fiber suspension is accomplished despite the interference due to the installation of one or more supporting arms to hold the center piece.

Immediately after this narrowest cross section, the cross section expands in the form of a step, and the cross-sectional enlargement is accomplished both by the enlargement of the inside diameter of the mixing section, i.e., the mixing section has a greater inside diameter than the outlet of the feed section, and by the reduction of the diameter of the center core. Into the steps thus formed extend air conduits, i.e., the liquid ring of fiber suspension formed by flowing through the ring injector is aerated both from the outside and from the inside. By this combined inside and outside aeration it is possible to achieve a very uniform distribution of air in the fiber suspension, the amount of aspirated air being determinable by the magnitude of the step. Since it is also dependent upon the surface area available, the result is necessarily that less air is aspirated internally than externally since the surface area is smaller in the inner ring.

The cross section $Q_3$ at the outlet of the mixing section is greater than the cross section $Q_2$ at the start of the mixing section. This requirement is due essentially to the friction occurring between the fiber suspension and the center core and the wall of the mixing section. Due to this friction the velocity drops in the area of the mixing sections, i.e., the full capacity which might be utilized for the aspiration of air is not available. To achieve a precise proportioning of the air, therefore, the friction of the liquid on the walls must be taken into account, i.e., the cross section $Q_3$ must be enlarged analogously to the increase in the amount of fiber suspension due to friction.

In the discharge section an additional increase in the cross section occurs, i.e., the cross section $Q_4$ at the outlet of the discharge section is greater than the cross section $Q_3$ at the end of the mixing sections. The result is a retardation of the velocity with which the fiber suspension enters the flotation cell.

An advantageous development of the invention provides for the cross section $Q_0$ at the start of the feed section to be 3 to 7 times the cross section Q1 at the output of the feed section. If it is less than the bottom limit, the flow will no longer be sufficiently quieted, and this considerably impairs the air loading. If the increase of the cross section is greater than 7 times, no improvement of the quieting effect occurs, so that this is to be avoided for reasons of design.

The cross section Q2 at the start of the mixing section amounts to 1.4 to 2.2 times the cross section Q1. Within these limits the desired rate of air flow that is available for aeration can be freely selected. At the same time this gives the height of the individual steps, and these can be computed taking the surface area into consideration.

The cross section Q3 at the start of the mixing section amounts to 1.8 to 2.2 times the cross section Q1, these figures being dependent upon the dispersion that is to be floated, i.e., different values will be obtained according to whether a fiber suspension is involved or whether solid particles, such as ore or coal of considerably different weight are to be floated. The behavior of these suspensions as regards friction differs greatly. The result is also a relatively wide range in which this cross-sectional variation is accomplished.

The cross section Q4 at the outlet of the discharge section amounts to 3 to 5 times the cross section Q1. Beyond these limits the fiber dispersion enters the flotation cell at too high a velocity, on the one hand, and on the other hand separations from the walls occur, i.e., the laminar flow becomes a turbulent flow, so that the injector no longer operates in a controllable manner.

The length of the mixing section amounts, in an advantageous development of the invention, to 4 to 10 times twice the annular gap width in the area of the steps in the mixing section. The optimum is about 6 times twice the annular gap width, so that in the case of an annular gap of about 8 mm, a length of approximately 100 mm results. In this range an intensive mixing of the fiber suspension with air occurs, the air being distributed in the form of extremely fine bubbles in the fiber suspension.

In order to achieve a good aeration of the dispersion even in the case of large throughputs, the annular gap must be kept relatively narrow. The result will be very great dimensions in this area, although they are necessary only for the aeration. Through a preferred embodiment of the invention it is possible to reduce the dimensions of the ring injector at the outlet side, because the center core is in the form of a hollow truncated cone tapering toward the nozzle outlet, and the mixing and discharge sections are in the form of hollow truncated cones tapering toward the nozzle outlet.

Needless to say, care must be taken that the cross section nevertheless increases from the start of the mixing section to the end of the discharge section.

It has been found advantageous in this case for the cone angle to be preferably between 30 and 420 minutes.

Preferably the walls are parallel in the area of the mixing section, since this preserves the capture cross section known in the art of injector nozzles.

The required enlargement of the outlet cross section Q3 at the end of the mixing section with respect to the entry cross section Q2 at the beginning of the mixing section can, of course by accomplished by a cylindrical configuration of the mixing section and/or center core. Thus it is conceivable to provide for enlargement stepwise by a fine gradation, the steps either increasing the inside diameter of the mixing section or decreasing the outside diameter of the center core, it being conceivable to use a combination of both. The more elegant solution, however, is the conical expansion of the mixing section or the conical tapering of the center core, a combination of both being possible if the overall ratio is not substantially more or less than 1:100.

The overall ratio is the ratio of the maximum inside diameter of the mixing section minus the core diameter at the outlet to the inside diameter of the mixing section minus the core diameter at the inlet in the region beyond the annular groove.

Especially important embodiments of the invention provide that both the mixing section and the center core have an annular groove in the area of the step. These annular grooves serve for the distribution of the input air. It is also possible to provide only one air feed for the outer aeration and one for the internal aeration, each terminating in the area of the annular grooves. In the case of the outer aeration, the annular groove is directly accessible without difficulty, but in the case of the internal aeration, special measures must be adopted.

Therefore one good embodiment of the invention provides for disposing an aeration nipple extending with its conical head into a notch in the center core in the area of the annular channel. The conical head of the aeration nipple divides the ring formed by the flow, so that most of the liquid flows about this conical head and thus makes it possible for the air to enter the annular groove in the area of the notch, divide at that point, and provide for the internal aeration. Between the conical head and the notch, however, there remains a free space which allows the passage of fiber suspension. However, care must be taken to prevent clogging of this free space, so it is to be of such dimensions that no fibers can gather in this area.

A preferred embodiment of the invention provides for air feed ducts extending directly into the annular grooves. The air feed in this case is delivered through one or more supporting arms, the feed section, in one desirable embodiment of the invention, being disposed at an angle of 30 to 90 degrees with respect to the mixing section, and the center core being provided with at least one fin in the area of the feed section. By this design the fiber suspension is deflected in the feed section and quieted by the built-in fin or the built-in fins which are situated directly at the end of the deflection, so that no rotation can occur. The occurrence of rotation or spin would on the one hand interfere with the charging of the fiber suspension with air and on the other hand it could cause the center core, which is composed of individual parts screwed together, to come apart.

One especially preferred embodiment of the invention provides for the center core to be mounted on a support arm which is of sword-like shape, the support arm being best made hollow and being connected to the outside air in the area of the feed section and with the air feed ducts in the area of the center core.

Mounting on a single support arm prevents the gathering of fibers, especially if it is sword-shaped, because the fibers find no foothold and thus cannot build up into clumps. This eliminates the danger of clogging, such as can be produced by layering. Since the support arm is in the form of a tube, i.e., is of hollow construction, it is possible to feed the air for internal aeration directly through the support arm so that no other baffles are necessary on the injector.

According to an advantageous embodiment of the invention, the support arm is in this case fastened in an insert sleeve disposed in the feed section. The conical head of the center core in this case merges smoothly with the tubular supporting arm, which in turn is connected to the insert sleeve. In this design, a casting can be involved, but it is also possible to weld or solder the individual parts together. In all cases, this procedure or the casting procedure is followed by a machining of the insert sleeve in a lathe so that it can be inserted with a sliding fit into a matching part of the feed section.

The feed section itself is advantageously provided with an annular passage in the area of the foot of the support arm, so that, regardless of the position in which the insert sleeve with the support arm and the conical head is inserted into the feed section, the aspiration of air will be possible.

The center core as such consists preferably of two parts which are fastened together by a screw joint. By loosening the screw joint, which is best secured by a setscrew, the air ducts which are disposed in the tail part of the center core can easily be cleaned.

In many cases it is not possible to feed the fiber suspension to the injector in a completely smooth manner. Frequently rotation still occurs. This rotation, however, interferes with the feed of air to the inner and outer areas. Thus the air loading of the fiber suspension becomes uncontrollable in certain ranges. The pressure distribution of the air in the outer and inner areas varies, i.e., the rate of air delivery also varies. To prevent the rotation of the fiber suspension and furthermore create a pressure equalization between outer and inner aeration, an advantageous embodiment of the invention provides for the center core to be provided in the area of the feed section with at least one fin.

The fin, which according to a very desirable embodiment of the invention is welded to the support arm of the center core, continues the division of a ring forming about the center core through the support arm, so that a quieting of the flow occurs and rotation is securely prevented.

One preferred embodiment of the invention also provides for the fin to extend all the way to the step at which the air enters the fiber suspension, so that the ring of fiber suspension that is forming is opened all the way into the area of the entrance of the air. Thus a space is produced in this area in which the inside air and the outside air can communicate with one another and thus produce the pressure equalization, thereby assuring that both the inner and the outer ring of the fiber suspension are subjected to the same air pressure.

The invention is described below with the aid of the drawings wherein.

Figure 1:
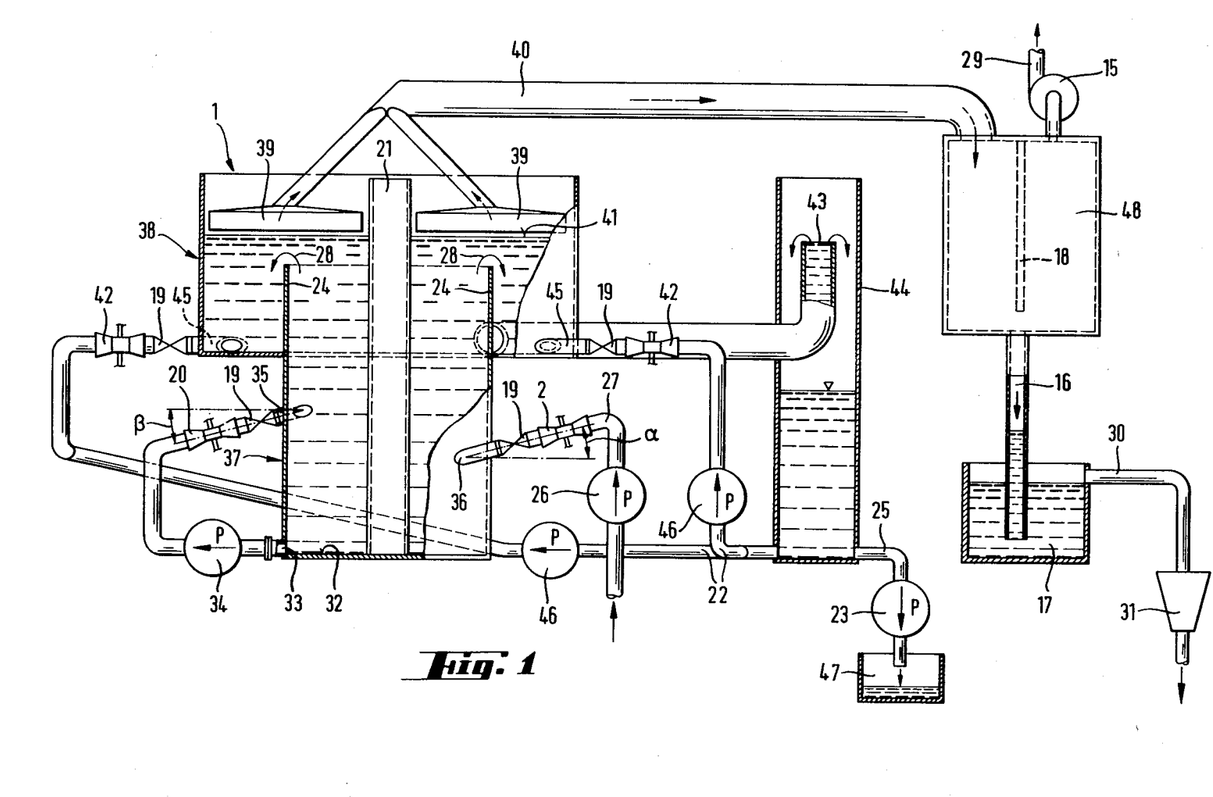
FIG. 1 is a diagrammatic cross section through a flotation cell.
Figure 2:
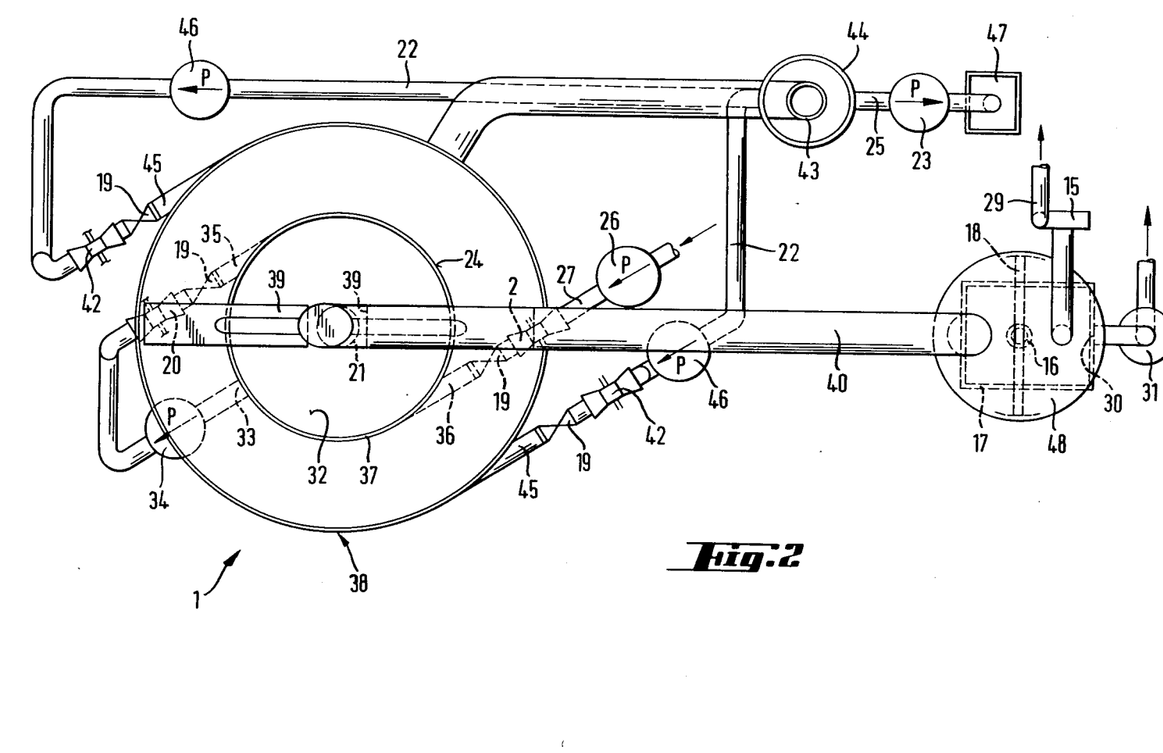
FIG. 2 is a top plan view of the same apparatus.

Fiber suspension, which is waste paper pulp which has been chemically and physically disintegrated, is delivered as the primary stream by the pump 26 to the pipeline 27 which connects the pump 26 to the connection 36 which bears the ring injector 2. The connection 36, and with it the ring injector 2, is inclined downwardly at an angle of 15 degrees from the horizontal and is disposed at about 500 mm above the bottom 32 of the flotation cell 1. The fiber suspension is aerated by the ring injector 2 and rises with the bubbles that form in the cylindrical vessel 37 whose center is formed by the hollow column 21, to where it passes over the weir 24 formed by the cylindrical vessel 37 and into the annular cell 38. After the annular cell 38 fills up, the fiber suspension rises to a level 41 which is given by the height of the overflow 43 connecting the annular cell 38 to the overflow collector 44.

A circulation pump 34 connected at the bottom 32 withdraws fiber suspension below the connection 36 for the primary stream through the suction connection 33 and, after it has been aerated by circulation injectors 20, which are flanged to the secondary connection 35, feeds it back to the cylindrical vessel 37. The secondary connections 35 are aimed upwardly at an angle of 15 degrees.

This secondary stream of the fiber suspension, like the primary stream of the fiber suspension, yields air bubbles which rise and to which dirt particles attach themselves. These dirt particles form with the air bubbles a foam layer which builds up over the weir 24 and is aspirated away by suction nozzles 39 which are disposed on a suction line 40. The suction line 40 terminates in a separator 48 in which a vacuum is produced by a blower 15. The exhaust air leaves the separator through the exhaust connection 29, the removed foam collapses and precipitates in the bottom portion of the separator 48 and then falls through tube 16 into the dirt collector 47. Thus no foam gets past the deflector 18, so that nothing but foam-free air reaches the blower 15.

The dirt collector 17 is connected by an overflow pipe 30 to a concentrator 31 which is usually a combination of centrifuge and filter.

Good stuff from the annular cell 38 is withdrawn from the overflow collector 44 by a counterflow pump 46 connected to the good stuff line, re-aerated through counterflow injectors 42 and returned to the annular cell 38 through a connection 45. The counterflow injectors 42 are in this case disposed tangential to the annular cell 38, so that a certain rotating movement develops in the annular cell 38, which continually drives the foam gathering on the surface to the suction nozzles 39.

The good stuff discharge 25, which is also attached to the overflow collector 44 is connected to the good stuff pump 23 which transports the good stuff to the vat 47 whence it is pumped to the paper machine, which is not shown.

The ring injectors 2 are, like the counterflow injectors 42 and the circulating injectors 20, separated from the annular cell 38 and their respective feed lines by shutoff valves 19. Arranging shutoff valves 19 on the injectors 2, 20 and 42 permits inspection or cleaning of these injectors without emptying the cylindrical vessel 37.

Figure 3:
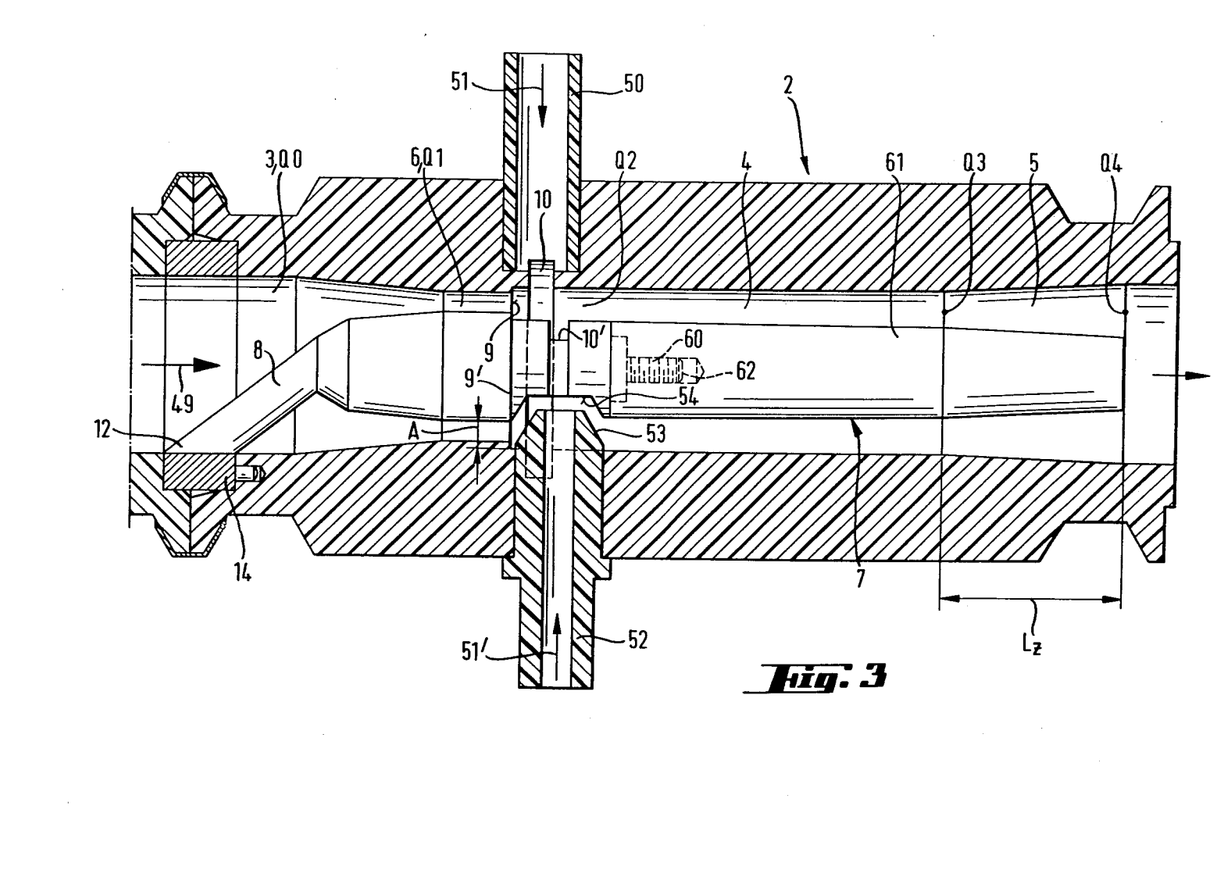
FIG. 3 is a cross section of a ring injector.
Figure 4:
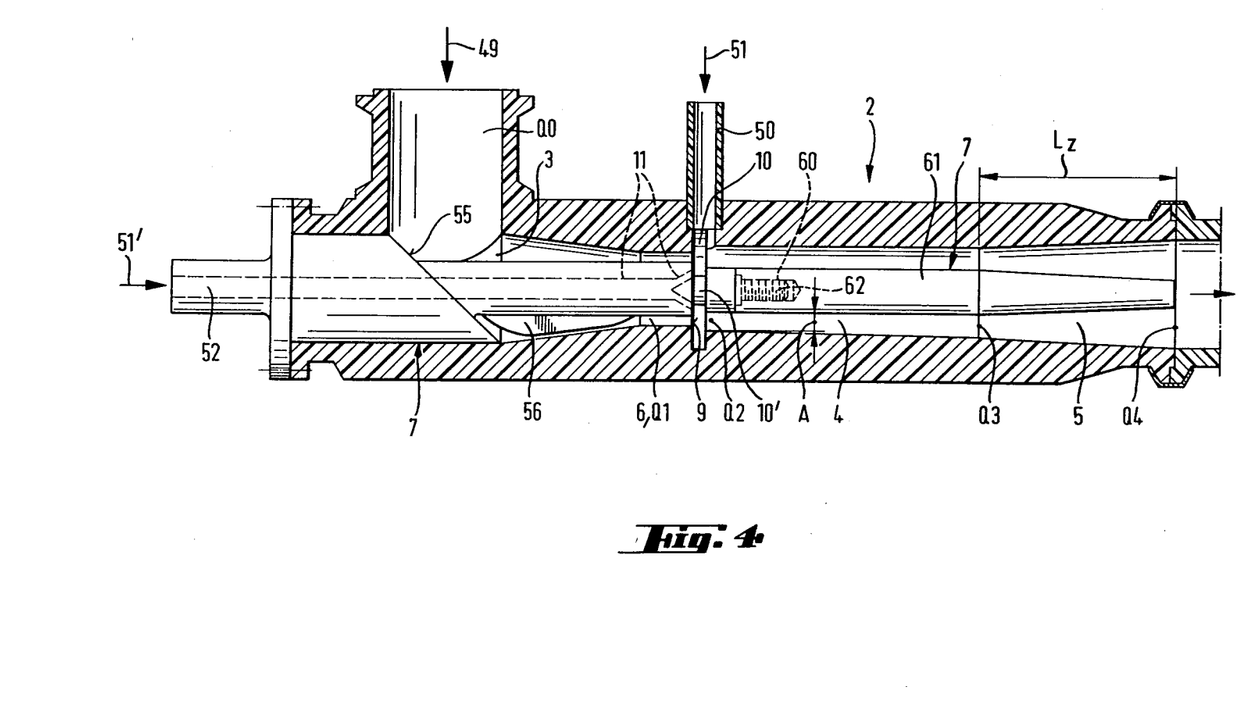
FIGS. 4 and 5 each represent additional embodiments of a ring injector.
Figure 5:
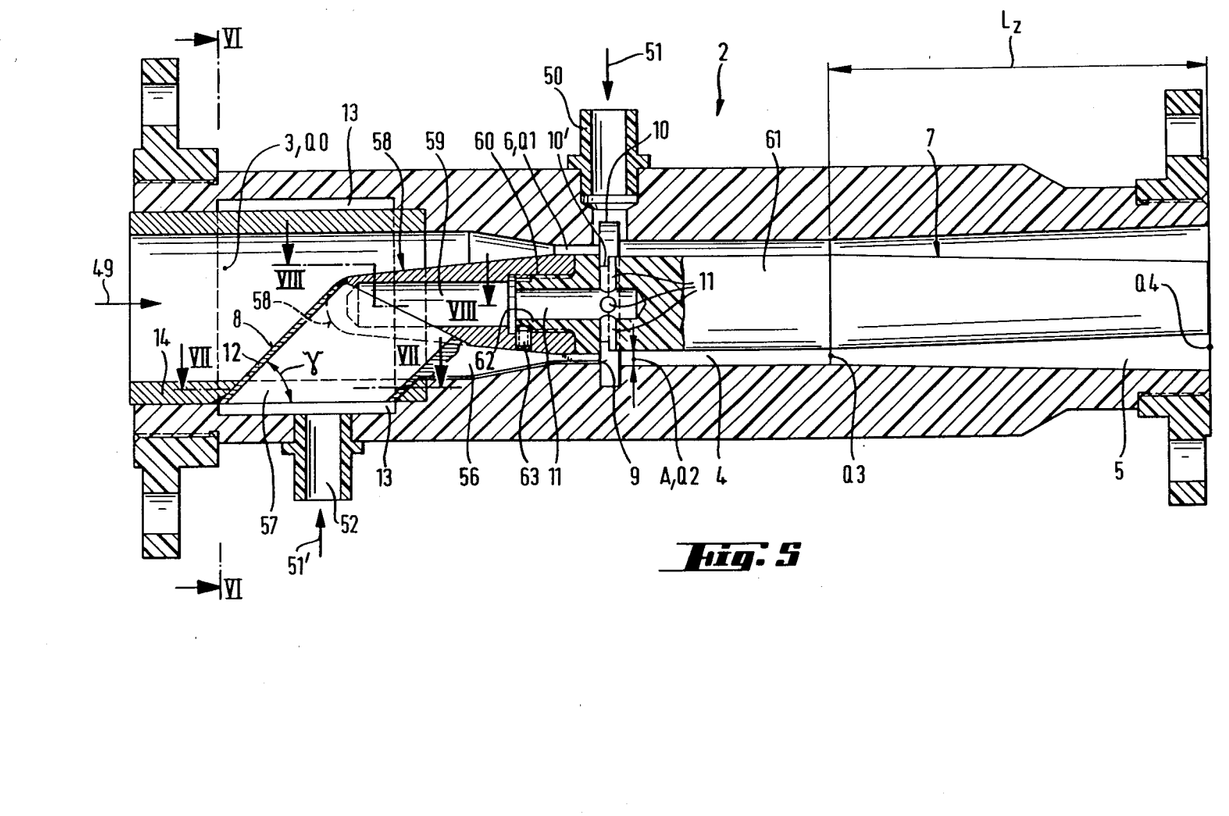

FIGS. 3 and 5 show a ring injector 2 in which the dispersion, as indicated by the arrow 49, enters the ring injector 2 parallel to the center core 7. The ring injector 2 consists of the feed section 3 represented on the left side of drawings 3, 4 and 5, whose cross section $Q0$ tapers conically and at its output forms an annular gap 6 with the center core 7. This annular gap 6 has the cross section $Q1$, which is the smallest cross section of the ring injector 2, i.e., the nozzle at which the vacuum is formed for the aspiration of air.

The annular gap 6 is followed by the mixing section 4 which forms a step in relation to the annular gap 6, such that the cross section is abruptly enlarged in this area. An annular groove 10 is disposed in the mixing section 4 adjacent to this step 9 and is connected to a nipple 50. This nipple 50 is connected to the atmosphere by a hose, which is not shown, and which is normally terminated above the height of the flotation cell, so that when the ring injector 2 is fed with a fiber suspension air is aspirated through the nipple 50 in the direction of the arrow 51. This air distributes itself through the annular channel 10 and joins the fiber suspension in the mixing section 4, at least in its outer portion. Thus the liquid ring formed by the fiber suspension is aerated from the outside in.

For the aeration of the inside surface of the ring of fiber suspension, an aeration nipple 52 is placed in the mixing section 4, as shown in FIG. 3, and its conical head 53 extends into the mixing section 4 and enters slightly into the notch 54 in the center core 7 behind the step 9'. The fiber suspension entering through the feed section 3, strikes against the conical head 53 after passing through the annular gap 6, while the vacuum that develops on account of the steps 9 and 9' causes air to flow in the direction of the arrows 51 and 51', and to mix with the fiber suspension. The mixing in the internal area of the fiber suspension ring is accomplished by the fact that the air aspirated by the aeration nipple 52 and flowing in the direction of the arrow 51', first strikes against the notch 54 and is distributed annularly around the center core 7 by the annular groove 10' communicating with the notch 54.

The center core 7, as represented in FIG. 3, tapers in the area of the mixing section, so that the cross section $Q_2$ increases in the direction of the outlet of the mixing section 4 ($Q_3$). This enlargement is necessary because the wall friction reduces the velocity of the fiber suspension in the mixing section, causing more fiber suspension to collect in this area and thus impairing the air feed. The enlargement of volume thus serves as an equalization for the fact that there is a larger amount of fiber suspension at the end of the mixing section than at the beginning of the mixing section due to the loss of velocity.

The insert ring 14, whose inside diameter corresponds to the inside diameter of the feed section 3, is installed in the latter by means of a sliding fit. An annular passage 13, which is disposed in the area of the aeration nipple 52 inside of the feed section 3, assures that outside air always has access—through distribution in the annular passage 13—to the interior of the supporting arm 8.

The center core 7 is, in this design, made in two parts. The rounded truncated cone 58 has a threaded bore 60 in which the tail piece 61 is engaged with its threaded stub 62. A setscrew 63 in the rounded truncated cone 58 prevents accidental loosening of the tail piece 61.

In the discharge section 5, the center core 7 has a greater taper. At the same time, the discharge section 5 flares in the direction of its outlet, so that the cross section $Q_4$ amounts to four times the cross section $Q_1$. The length of the discharge section $L_z$ is closely related to the taper of the cone of the center core 7 and to the flare of the discharge section 5. Thus, in the case of a length $L_z$ of 40 mm, a taper of 1:20 is possible, and in the case of a length of 200 mm, a taper of 1:50 will result.

FIG. 4 differs from the previously discussed FIG. 3 in that here the fiber suspension is delivered perpendicular to the center core 7 of the ring injector 2, and strikes a deflector 55 set at an angle of 45 degrees in the feed section 3, which deflects it at a right angle. In the deflection of the fiber stream, a spin can form under unfavorable conditions, and for this reason a fin 56 is disposed in the area of the feed section 3 and prevents rotation of the fiber suspension in the ring injector 2.

The external aeration of the tubular stream of fiber suspension formed in the annular gap 6 is accomplished in this design too by a nipple 50 which opens into an annular groove 10 in the mixing chamber 4, as was the case also in the other designs. Likewise, the center core 7 has an annular groove 10' in this area, which serves for the distribution of the air for the internal aeration. Unlike the other designs, however, the internal air is delivered from behind, parallel to the center core 7, and distributes itself through air passages 11 in the annular groove 10'. The mixing section 4 is in this case constructed such that it flares from the annular gap 6 towards its outlet, while the center core 7 is of cylindrical shape in this area.

Figure 6:
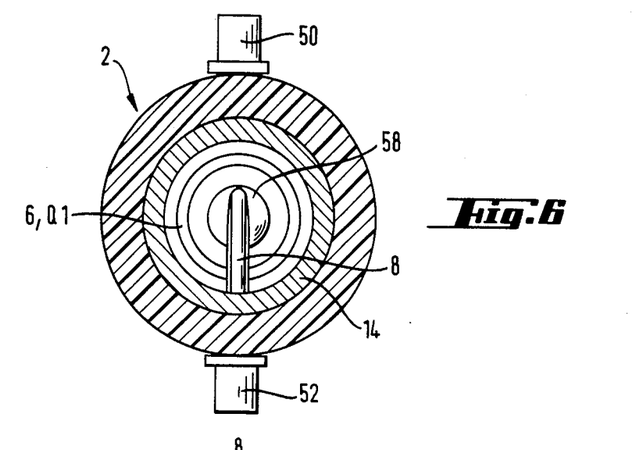
FIGS. 6 to 8 show details of the ring injector according to FIG. 5.
Figure 7:
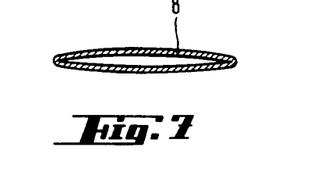
Figure 8:
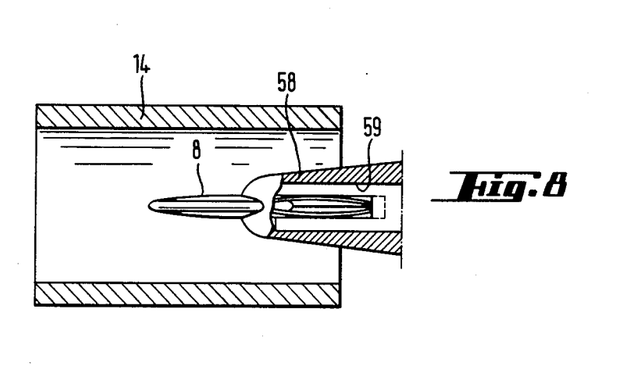

FIG. 5 and its details shown in FIGS. 6 to 8 represent an especially preferred embodiment of the invention. The center core 7 in this case is held by a supporting arm 8 in an insert sleeve 14 which has an inlet opening 57 at the foot 12 of the supporting arm. The supporting arm 8 is in the form of a tube of sword-like cross section so as to offer the least possible resistance to the flow of the fiber suspension and thus prevent the build-up of fibers on it. The fin 56 is welded to it and to the center core 7; the fin is defined by the inside of the feed section 3 and extends all the way to the step 9. To prevent build-up of fibers, the supporting arm is at an angle of 45 degrees and is welded to the rounded truncated cone 58 which is the beginning of the center core 7 extending into the feed section 3. The rounded truncated cone 58 has in its interior a bore 59 whereby it communicated with the interior of the supporting arm 8 and thus with the aeration nipple 52 on the outside of the ring injector 2 and with the air feed passages 11 in the interior of the center core 7.

The insert sleeve 14, whose inside diameter corresponds to the inside diameter of the feed section 3, is placed in the latter with a sliding fit. An annular passage 13, which is disposed in the area of the aeration nipple 52 inside of the feed section 3, assures that the outside air will always have access—by distribution in the annular passage 13—to the interior of the supporting arm 8.

The center core 7 in this design is bipartite, the rounded truncated cone 58 having a threaded bore 60 which is engaged by the threaded stub 62 of the tail piece 61 containing the air feed passages 11. A setscrew 63 in the rounded truncated cone 58 prevents accidental loss of the tail piece 61.

Figure 9:
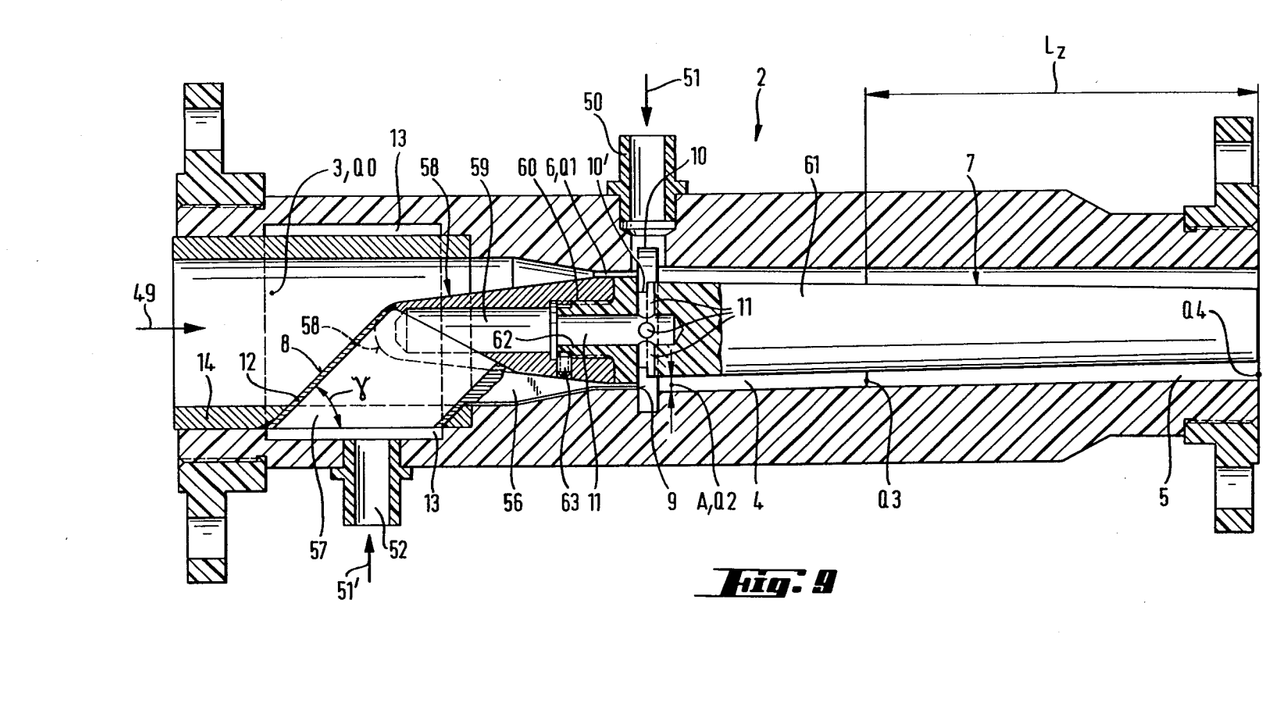

FIG. 9 shows a ring injector 2 in which both the center core 7 and the mixing section 4 and discharge section 5 taper toward the cross section $Q_4$.

The fiber suspension enters the ring injector 2 through the feed section 3 and then passes through the annular gap 6. The annular gap 6 has a width of only 2 to 5 mm, and, so as not to prduce excessively high flow velocities, it has a large diameter. The annular gap 6 is surrounded externally by the annular groove 10 which communicates with the atmospheric air. Likewise, the hollow supporting arm, on which the center core 7 is fastened, is in communication with the atmospheric air which, as indicated by the arrows 51, 51', is aspirated by the flowing fiber suspension. The center core 7 tapers continuously from the area of the annular groove 10 to the discharge of the ring injector 2. The outer boundary of the mixing section 4 runs parallel to the tapering center core 7. The discharge section 5 is likewise in the form of a hollow cone, but no longer runs parallel to the center core 7, and instead diverges, so that a retardation of the flow results.

We claim:

1. In an apparatus for the aeration of dispersions, which comprises a flotation cell having at least one ring injector associated with it, said ring injector comprising:

an outer tubular casing defining an axis and having two ends and including a dipersion feed section at one end, a mixing section and a discharge section at the other end and a center core located inside and extending substantially the length of the tubular casing thereby defining said sections as an annular gap, support arm means in said feed section for mounting the center core in the casing, the feed section having an inlet and an outlet and the center core forming with the outlet of the feed section an annular gap portion having a first cross section, the outer casing being expanded in the form of a step in relation to the outlet of the feed section and the center core having a decrease in thickness at the same point along the axis thereby forming the inlet of the mixing section having a second cross section, the center core than having a further decrease in thickness in the form of a groove in the area of the mixing section, air ducts extending into the step at the inlet of the mixing section and into the groove of the center core, the mixing section having an inlet and an outlet and the cross section at the outlet of the mixing section being greater than the cross section at the inlet of the mixing section, the discharge section having an outlet and the cross section at the outlet of the discharge section being greater than the cross section at the outlet of the mixing section.

2. Apparatus according to claim 1 wherein, the cross section of the inlet of the feed section is 3 to 7 times the cross section at the outlet of the feed section, the cross section at the beginning of the mixing section is 1.4 to 2.2 times the cross section at the outlet of the feed section, the cross section at the outlet of the mixing section is 1.8 to 2.2 times the cross section at the outlet of the feed section, and the cross section at the outlet of the discharge section is 3.0 to 5.0 times the cross section at the outlet of the feed section.

3. Apparatus according to claim 1, wherein the length of the mixing section amounts to 4 to 10 times twice the width of the annular gap in the area of the step at the inlet of the mixing section.

4. Apparatus according to claim 1, wherein the center core tapers inwardly slightly conically toward the outlet of the mixing section.

5. Apparatus according to claim 1, characterized in that the mixing section flares slightly conically outwardly toward its outlet.

6. Apparatus according to claim 4, characterized in that the taper or flare ratio amounts to approximately 1:100.

7. Apparatus according to claim 1, wherein the outer casing has an annular groove which extends into one of the air ducts.

8. Apparatus according to claim 1, in which the center core has at least one fin in the area of the feed section.

9. Apparatus according to claim 8, in which the fin extends all the way to the step to the inlet of the mixing section.

10. Apparatus according to claim 9, in which the fin is welded to the support arm means.

11. Apparatus according to claim 1, wherein the center core at the area of the groove has a notched area and the air ducts comprise an aeration nipple having a conical head extending into said notched area in the center core.

12. Apparatus according to claim 11, in which the center core is in the form of a truncated cone after the groove tapering inwardly in the direction of the discharge outlet, and in which the outlet of the mixing section and the discharge section are in the form of hollow truncated cones tapering inwardly in the direction of the discharge outlet.

13. Apparatus according to claim 12, wherein the cone angle of the truncated cone and hollow truncated cone is between 30 minutes and 420 minutes from the axis.

14. Apparatus according to claim 12, wherein in the area of the mixing section the walls of the truncated cone and hollow truncated cone run parallel.

15. Apparatus according to claim 1, wherein the support arm is of a sword shaped configuration.

16. Apparatus according to claim 1, in which the support arm means is made hollow, and is connected in the area of the feed section with the outside air, and in the area of the center core with the air feed ducts.

17. Apparatus according to claim 1 which includes an insert sleeve disposed in the feed section and in which the support arm means is fastened in the insert sleeve.

18. Apparatus according to claim 1, in which the feed section is provided with an annular passage in the area of the support arm means.

19. Apparatus according to claim 1, in which the center core comprises two parts which are fastened together by screwing.

* * * * *

UNITED STATES PATENT AND TRADEMARK OFFICE
CERTIFICATE OF CORRECTION

PATENT NO. : 4,721,562
DATED : January 26, 1988
INVENTOR(S) : Wolfgang Barnscheidt, et al.

It is certified that error appears in the above-identified patent and that said Letters Patent is hereby corrected as shown below:

ON THE TITLE PAGE, Item [73],

For "Feldmuéle Aktiengesellschaft" read

-- Feldmühle Aktiengesellschaft --.

Column 10, line 14, "the" should read -- said --.

Column 10, line 30, after "groove" insert -- , the truncated cone --.

Signed and Sealed this

Fourteenth Day of February, 1989

Attest:

DONALD J. QUIGG

*Attesting Officer*    *Commissioner of Patents and Trademarks*